(12) United States Patent
Baldwin et al.

(10) Patent No.: US 11,751,712 B2
(45) Date of Patent: Sep. 12, 2023

(54) FOOD PREPARATION GUIDANCE SYSTEM

(71) Applicant: Breville USA, Inc., Torrance, CA (US)

(72) Inventors: Douglas Baldwin, Arvada, CO (US);
Marc Ian Feifel, Seattle, WA (US);
Christopher Charles Young, Seattle, WA (US)

(73) Assignee: BREVILLE USA, INC., Torrance, CA (US)

( * ) Notice: Subject to any disclaimer, the term of this patent is extended or adjusted under 35 U.S.C. 154(b) by 695 days.

(21) Appl. No.: 14/974,635

(22) Filed: Dec. 18, 2015

(65) Prior Publication Data

US 2016/0174748 A1 Jun. 23, 2016

Related U.S. Application Data

(60) Provisional application No. 62/095,669, filed on Dec. 22, 2014.

(51) Int. Cl.
*A47J 27/10* (2006.01)
*A47J 27/00* (2006.01)
(Continued)

(52) U.S. Cl.
CPC ............... *A47J 27/10* (2013.01); *A23L 5/10* (2016.08); *A23L 5/17* (2016.08); *A47J 27/004* (2013.01); *A47J 36/321* (2018.08)

(58) Field of Classification Search
CPC . A47J 27/10; A47J 27/004; A23L 5/10; A23L 5/17
See application file for complete search history.

(56) References Cited

U.S. PATENT DOCUMENTS 4,309,584 A   1/1982   Terakami et al.
4,390,766 A   6/1983   Horinouchi et al.
(Continued)

FOREIGN PATENT DOCUMENTS

CN   101513118 A   7/2007
CN   103917140 A   10/2012
(Continued)

OTHER PUBLICATIONS

International Search Report and Written Opinion of the International Searching Authority, dated May 12, 2016, for International Application No. PCT/US2016/015388, 9 pages.
(Continued)

*Primary Examiner* — Steven N Leff

(57) ABSTRACT

Systems, methods, and articles to provide customized control of a cooking appliance, such as a sous vide cooker. A user provides a selection of one or more ending characteristics for a food product. A processor-based device determines one or more output food preparation parameters based on the user's selection of the one or more ending characteristics. Measurements of temperature, power delivery, or other characteristics may be obtained during cooking process. A cooking program controlling the cooking process may be revised or updated based at least in part on the obtained measurements or analysis of the measurements. Estimations or projections about the cooking process may be presented to a user via a user interface of the cooking appliance or a user interface of a computing device (e.g., smartphone) associated with the user.

31 Claims, 4 Drawing Sheets

(51) Int. Cl.
 *A23L 5/10*  (2016.01)
 *A47J 36/32*  (2006.01)

(56) References Cited

U.S. PATENT DOCUMENTS

| | | |
|---|---|---|
| 4,807,169 A | 2/1989 | Overbeck |
| 5,096,725 A | 3/1992 | Kim |
| 5,183,984 A | 2/1993 | Nakagawa et al. |
| 5,352,874 A | 10/1994 | Gong et al. |
| 5,750,960 A | 5/1998 | Bresolin |
| 5,877,477 A | 3/1999 | Petty et al. |
| 6,539,842 B1 | 4/2003 | Chapman et al. |
| 6,568,848 B1 | 5/2003 | Chapman et al. |
| 6,712,505 B2 | 3/2004 | Chapman et al. |
| 6,759,637 B2 | 7/2004 | Kim et al. |
| 6,789,067 B1 | 9/2004 | Liebenow |
| 6,811,308 B2 | 11/2004 | Chapman et al. |
| 6,846,453 B1 | 1/2005 | Uesaka et al. |
| 6,933,483 B2 | 8/2005 | Chun et al. |
| 7,102,107 B1 | 9/2006 | Chapman |
| 7,372,368 B2 | 5/2008 | Chapman et al. |
| 7,605,349 B2 | 10/2009 | Steinman et al. |
| 7,685,256 B2 | 3/2010 | Kudo et al. |
| 7,722,248 B1 | 5/2010 | Chapman et al. |
| 8,240,914 B1 | 8/2012 | Chapman et al. |
| 8,323,026 B2 | 12/2012 | Do et al. |
| 8,342,847 B2 | 1/2013 | Grigsby et al. |
| 8,419,434 B2 | 4/2013 | Do et al. |
| 8,455,028 B2 | 6/2013 | Breunig et al. |
| 10,194,770 B2 | 2/2019 | Young et al. |
| 2003/0037681 A1 | 2/2003 | Zhu et al. |
| 2004/0267382 A1 | 12/2004 | Cunningham et al. |
| 2005/0193901 A1 | 9/2005 | Buehler et al. |
| 2006/0136078 A1 | 6/2006 | Chen et al. |
| 2007/0158335 A1 | 7/2007 | Mansbery |
| 2008/0136785 A1 | 6/2008 | Baudisch et al. |
| 2008/0140862 A1 | 6/2008 | Elston et al. |
| 2008/0222553 A1 | 9/2008 | Benjamin-Lambert et al. |
| 2009/0029326 A1 | 1/2009 | Kark et al. |
| 2009/0236335 A1 | 9/2009 | Ben-Shmuel et al. |
| 2009/0258331 A1 | 10/2009 | Do et al. |
| 2009/0268331 A1 | 10/2009 | Kim et al. |
| 2010/0147823 A1 | 6/2010 | Anderson et al. |
| 2010/0292998 A1 | 11/2010 | Bodlaender et al. |
| 2010/0313768 A1 | 12/2010 | Koether et al. |
| 2010/0326286 A1* | 12/2010 | Romero .................. A47J 27/18 99/325 |
| 2011/0185915 A1 | 8/2011 | Eades et al. |
| 2012/0032524 A1 | 2/2012 | Baarman et al. |
| 2013/0092680 A1 | 4/2013 | Cartwright et al. |
| 2013/0125763 A1 | 5/2013 | Valance |
| 2013/0294477 A1* | 11/2013 | Rankin .................. G01K 13/00 374/45 |
| 2013/0306627 A1 | 11/2013 | Libman et al. |
| 2014/0107178 A1 | 4/2014 | Brown et al. |
| 2014/0292536 A1 | 10/2014 | Barth et al. |
| 2014/0295822 A1 | 10/2014 | Koo et al. |
| 2014/0314921 A1 | 10/2014 | Kuempel et al. |
| 2015/0194041 A1 | 7/2015 | Allen |
| 2015/0212661 A1 | 7/2015 | Robberechts et al. |
| 2015/0257574 A1 | 9/2015 | Hoare et al. |
| 2015/0290795 A1 | 10/2015 | Oleynik |
| 2015/0294225 A1 | 10/2015 | Takei et al. |
| 2015/0312964 A1 | 10/2015 | Sorenson et al. |
| 2016/0005327 A1 | 1/2016 | Young et al. |
| 2016/0073451 A1 | 3/2016 | Reishmann et al. |
| 2016/0100717 A1 | 4/2016 | Zhu |
| 2016/0198885 A1 | 7/2016 | Logan et al. |
| 2016/0220064 A1 | 8/2016 | Young et al. |
| 2016/0235239 A1 | 8/2016 | Patadia |
| 2016/0315784 A1 | 10/2016 | Wu et al. |
| 2016/0324366 A1 | 11/2016 | Wu et al. |
| 2017/0007064 A1 | 1/2017 | Chen |
| 2017/0020324 A1 | 1/2017 | Young et al. |
| 2017/0139385 A1 | 5/2017 | Salazar et al. |
| 2017/0150842 A1 | 6/2017 | Young et al. |
| 2017/0162073 A1 | 6/2017 | Salazar et al. |

FOREIGN PATENT DOCUMENTS

| | | |
|---|---|---|
| CN | 104898613 A | 9/2015 |
| EP | 1406184 A1 | 4/2004 |
| EP | 2292981 A2 | 3/2011 |
| EP | 2 767 159 B1 | 11/2015 |
| JP | 2002-63178 A | 2/2002 |
| JP | 2003-50907 A | 2/2003 |
| JP | 3602400 B2 | 12/2004 |
| JP | 4288208 B2 | 7/2009 |
| KR | 10-1990-0012053 A | 8/1990 |
| KR | 10-2008-0089947 A | 10/2008 |
| KR | 10-2011-0080988 A | 7/2011 |
| KR | 10-2012-0029027 A | 3/2012 |
| KR | 10-2014-0051153 A | 4/2014 |
| KR | 10-2014-0103798 A | 8/2014 |
| TW | 201346694 A | 12/2012 |
| WO | 2007/051049 A2 | 5/2007 |
| WO | 2012/092641 | 7/2012 |
| WO | 2015075730 A2 | 5/2015 |
| WO | 2017/015270 | 1/2017 |

OTHER PUBLICATIONS

Young et al., "Food Preparation Control System," U.S. Appl. No. 15/009,525, filed Jan. 28, 2016, 72 pages.
EPO 94(3) communication in EP application No. 15818874.8 dated Jun. 5, 2018, 10 pages.
International Search Report dated Sep. 23, 2015 for International Application No. PCT/US2015/038858, 3 pages.
Written Opinion dated Sep. 23, 2015 for International Application No. PCT/US2015/038858, 11 pages.
International Search Report and Written Opinion, dated Jan. 25, 2017, for International Application No. PCT/US2016/057205, 16 pages.
International Search Report and Written Opinion, dated Jan. 31, 2017, for International Application No. PCT/US2016/061886, 9 pages.
International Search Report and Written Opinion, dated Oct. 27, 2016, for International Application No. PCT/US2016/042924, 17 pages.
Young et al., "Data Aggregation and Personalization for Remotely Controlled Cooking Devices," U.S. Appl. No. 15/351,091, filed Nov. 14, 2016, 85 pages.
International Search Report, dated Oct. 27, 2016, for International Application No. PCT/US2016/042924, 5 pages.
Written Opinion of the International Searching Authority, dated Oct. 27, 2016, for International Application No. PCT/US2016/042924, 12 pages.
Young et al., "Food Preparation Control System," U.S. Appl. No. 15/214,056, filed Jul. 19, 2016, 95 pages.
International Search Report, dated Apr. 6, 2016, for corresponding International Application No. PCT/US2015/066697, 6 pages.
Written Opinion of the International Searching Authority, dated Apr. 6, 2016, for corresponding International Application No. PCT/US2015/066697, 11 pages.
European Patent Office, Extended European Search Report, EP Patent Application 16866918.2, dated Feb. 28, 2019, 10 pages.
Kasper, Lynne Rosetto. "There's more than one way to cook an egg, Dave Arnold has 11," Yetrieved from URL https://web.archive.org/web/20130416002008/https://www.splendidtable.org/story/theres-more-than-one-way-to-cook-an-egg-dave-arnold-has-11 on Sep. 5, 2018; Wayback machine date of Apr. 16, 2013. 4 pages.
Baldwin, Douglas. "DouglasBaldwin.com expert in sous vide cooking and nonlinear waves," <http://douglasbaldwin.com/sous-vide.html>, 2008, 40 pages.
Chinese Office Action, Application No. 201580076365.5, dated Apr. 9, 2019, 10 pages.

* cited by examiner

FOOD PREPARATION GUIDANCE SYSTEM

BACKGROUND

Technical Field

The present disclosure generally relates to food preparation, and in particular relates to providing food preparation control useful, for example, in sous vide cooking appliances.

Description of the Related Art

Cooking is the art of preparing food for consumption with the use of heat. There are numerous methods of cooking, most of which have been known for many years. These methods include baking, roasting, frying, grilling, barbecuing, smoking, boiling, steaming and braising, to name a few. Various methods use differing levels of heat and moisture and vary in cooking time. The particular method chosen normally affects the result because some foods are more appropriate to some methods than others are.

Cooking recipes are a set of instructions that describes how to prepare or make a food product. Recipes may generally include various information about a food product such as the required ingredients to prepare the food product along with the quantities and proportions of each of the ingredients, the necessary equipment, an ordered list of steps and techniques, one or more cooking times, one or more cooking temperatures, etc.

When cooking some food products, such as eggs, meat and vegetables, variations in the cooking time and cooking temperature can have significant effects on the resulting texture and taste. As people's tastes vary, different people have diverse preferences regarding the texture, taste, or other properties of cooked food products. Often it is difficult for a person cooking a food product to know precisely how to cook the food product to achieve a desired result, such as a desired texture, consistency, or doneness, for the food product.

BRIEF SUMMARY

A method of operation in a processor-based food preparation guidance system may be summarized as including receiving, by at least one processor, a request for preparation of a food product; in response to the received request, causing, by the at least one processor, a cooking program to be generated, the cooking program including at least one of instructions or data usable by a cooking appliance to perform a cooking process for the food product; controlling, by the at least one processor, a cooking appliance to perform the cooking process for the food product according to the cooking program; obtaining, by the at least one processor, at least one parameter measurement indicative of a characteristic of the cooking process during the controlling of the cooking appliance; and determining, by the at least one processor, at least one of an update to the cooking program or a cooking projection parameter relating to the cooking process based at least in part on the obtained at least one parameter measurement.

Causing a cooking program to be generated may include causing a cooking program to be generated at the food preparation guidance system and may further include sending the generated cooking program from the food preparation guidance system to the cooking appliance over a data channel. Sending the generated cooking program from the food preparation guidance system to the cooking appliance may include sending the generated cooking program from the food preparation guidance system to the cooking appliance over the data channel via a user computing device coupled to each of the food preparation guidance system and the cooking appliance. Obtaining at least one parameter measurement indicative of a characteristic of the cooking process may include obtaining a temperature measurement of a fluid bath of the cooking appliance and obtaining a measurement of an amount of heat transferred to the fluid bath. Obtaining at least one parameter measurement indicative of a characteristic of the cooking process may include obtaining a plurality of temporally spaced parameter measurements. Obtaining at least one parameter measurement indicative of a characteristic of the cooking process may include obtaining a plurality of temporally spaced temperature measurements and a plurality of corresponding temporally spaced measurements of an amount of heat transferred to the fluid bath. Obtaining at least one parameter measurement indicative of a characteristic of the cooking process may include obtaining a measurement indicative of at least one of temperature of a fluid bath of the cooking appliance or power delivered by the cooking appliance. Obtaining at least one parameter measurement indicative of a characteristic of the cooking process may include obtaining a temperature measurement from a temperature sensor of at least one of a surface of the food product or an interior of the food product. Obtaining a temperature measurement from a temperature sensor may include obtaining a temperature measurement from at least one of a resistive temperature detector, a thermocouple, a thermistor, a positive temperature coefficient element or a blackbody/infrared emissions detector. Obtaining at least one parameter measurement indicative of a characteristic of the cooking process may include obtaining a measurement indicative of power from at least one of a voltage sensor, a current sensor, a resistance sensor, a magnetic field sensor, a Hall effect sensor, or a giant magnetoresistance sensor. Causing a cooking program to be generated may include causing a cooking program to be generated that includes at least one of instructions or data usable by a cooking appliance to perform a cooking process for the food product, the cooking appliance comprising an immersion circulator and a vessel. Causing a cooking program to be generated may include causing a cooking program to be generated that includes at least one of instructions or data usable by a cooking appliance to perform an accelerated cooking process for the food product, wherein during the accelerated cooking process the cooking appliance first heats fluid in a fluid bath to a first temperature above a set-point temperature, and second heats fluid in the fluid bath to a second temperature less than or equal to the set-point temperature. Determining at least one of an update to the cooking program or a cooking projection parameter relating to the cooking process may include determining an estimated time until the food product reaches a specific condition.

The method may further include causing a prompt to be provided on a client computing device, the prompt including a request for a selection of an end characteristic for the food product; and receiving, by the at least one processor, a response to the prompt indicating a selection of the end characteristic for the food product; wherein causing a cooking program to be generated comprises causing a cooking program to be generated based at least in part on the selection of the end characteristic for the food product. Causing a prompt to be provided on a client computing device may include causing at least one of a first set of at least two prompts to be presented by the user computing device, each of the prompts in the first set of at least two prompts depicting respective different textures, consistencies, or doneness for the food product. Causing at least one of a first set of at least two prompts to be presented by the user computing device may include causing at least one of a first set of images or videos to be displayed by the user computing device. Causing a cooking program to be generated may include causing a cooking program to be generated based at least in part on at least one operational characteristic of the cooking appliance. Receiving a request for preparation of a food product may include receiving, by the at least one processor, a request for preparation of a food product from a remotely located client computing device.

The method may further include causing at least one of a first set of at least two prompts to be presented by a user computing device, each of the prompts in the first set of at least two prompts depicting a respective gradation of at least one first characteristic of the food product, the respective gradations being different from one another; and receiving, via the user computing device, a selection of one of the gradations of the at least one first characteristic of the food product; wherein causing a cooking program to be generated comprises causing a cooking program to be generated based at least in part on the received selection of one of the gradations of the at least one first characteristic of the food product. Receiving a request for preparation of the food product may include receiving, via a user computing device, a selection of the food product by a processor-based food preparation guidance system over a data channel, and causing a cooking program to be generated comprises generating a cooking program by the food preparation guidance system.

The method may further include causing the at least one of an update to the cooking program or a cooking projection parameter relating to the cooking process to be presented by a user computing device. Causing the at least one of an update to the cooking program or a cooking projection parameter relating to the cooking process to be presented by a user computing device may include sending data to the user computing device over a data channel. Causing a cooking program to be generated may include causing the determination of at least one of a cooking temperature or a cooking time for the food product.

The method may further include subsequent to receiving the request for preparation of the food product, causing at least one supplemental prompt to be presented by a user computing device; receiving, via the user computing device, a response to the at least one supplemental prompt; and determining at least one food preparation parameter for the cooking program based at least in part on the received response to the supplemental prompt. Causing at least one supplemental prompt to be presented by the user computing device may include causing at least one supplemental prompt to be presented by the user computing device, the at least one supplemental prompt relating to at least one of a physical characteristic of the food product, an environmental condition, or a food preparation condition. Causing at least one supplemental prompt to be presented by the user computing device may include causing at least one supplemental prompt to be presented by the user computing device, the at least one supplemental prompt relating to at least one of a size of the food product, a shape of the food product, a class of the food product, a temperature of the food product, an altitude, a geographic location, or a cooking method.

The method may further include determining, by the at least one processor, at least one of an estimation of a heat capacity of the cooking appliance or an estimation of heat loss by the cooking appliance.

The method may further include detecting, by the at least one processor, a loss of power delivered to the cooking appliance; and estimating, by the at least one processor, a duration of the loss of power.

The method may further include determining, by the at least one processor, at least one of an update to the cooking program, a cooking projection parameter relating to the cooking process, or a food safety indicator based at least in part on the estimated duration of the loss of power.

A processor-based food preparation guidance system may be summarized as including at least one processor; and at least one nontransitory processor-readable medium, communicatively coupled to the at least one processor and which stores at least one of processor-executable instructions or data, wherein in use the at least one processor: receives a request for preparation of a food product; in response to the received request, causes a cooking program to be generated, the cooking program includes at least one of instructions or data usable by a cooking appliance to perform a cooking process for the food product; controls a cooking appliance to perform the cooking process for the food product according to the cooking program; obtains at least one parameter measurement indicative of a characteristic of the cooking process during the controlling of the cooking appliance; and determines at least one of an update to the cooking program or a cooking projection parameter relating to the cooking process based at least in part on the obtained at least one parameter measurement. The at least one processor may send the generated cooking program to the cooking appliance over a data channel. The at least one processor may send the generated cooking program to the cooking appliance over the data channel via a user computing device coupled to each of the food preparation guidance system and the cooking appliance. The at least one processor may obtain a temperature measurement of a fluid bath of the cooking appliance; and obtain a measurement of an amount of heat transferred to the fluid bath. The at least one processor may obtain a plurality of temporally spaced parameter measurements. The at least one processor may obtain a plurality of temporally spaced temperature measurements and a plurality of corresponding temporally spaced measurements of an amount of heat transferred to the fluid bath. The at least one processor may obtain a measurement indicative of at least one of temperature of a fluid bath of the cooking appliance or power delivered by the cooking appliance. The at least one processor may obtain a temperature measurement from a temperature sensor. The at least one processor may obtain a temperature measurement from at least one of a resistive temperature detector, a thermocouple, a thermistor, a positive temperature coefficient element or a blackbody/infrared emissions detector.

The at least one processor may obtain a measurement indicative of power from at least one of a voltage sensor, a current sensor, a resistance sensor, a magnetic field sensor, a Hall effect sensor, or a giant magnetoresistance sensor. The at least one processor may obtain a measurement indicative of power based at least in part on at least one of an output of a controller or an assumed or estimated characteristic of a heater of the cooking appliance. The cooking appliance may include an immersion circulator and a vessel. The at least one processor may cause a cooking program to be generated that includes at least one of instructions or data usable by a cooking appliance to perform an accelerated cooking process for the food product, wherein during the accelerated cooking process the cooking appliance first heats fluid in a fluid bath to a first temperature above a set-point temperature, and second heats fluid in the fluid bath to a second temperature less than or equal to the set-point temperature. The at least one processor may determine an estimated time until the food product reaches a specific condition. The at least one processor may cause a prompt to be provided on a user computing device, the prompt including a request for a selection of an end characteristic for the food product; receive a response to the prompt indicating a selection of the end characteristic for the food product; and cause a cooking program to be generated based at least in part on the selection of the end characteristic for the food product. The at least one processor may cause at least one of a first set of at least two prompts to be presented by the user computing device, each of the prompts in the first set of at least two prompts depicting respective different textures, consistencies, or doneness for the food product. The at least one processor may cause at least one of a first set of images or videos to be displayed by the user computing device. The at least one processor may cause a cooking program to be generated based at least in part on at least one operational characteristic of the cooking appliance. The at least one processor may receive a request for preparation of a food product from a remotely located client computing device.

The at least one processor may cause at least one of a first set of at least two prompts to be presented by a user computing device, each of the prompts in the first set of at least two prompts depicting a respective gradation of at least one first characteristic of the food product, the respective gradations being different from one another; receive a selection of one of the gradations of the at least one first characteristic of the food product; and cause a cooking program to be generated based at least in part on the received selection of one of the gradations of the at least one first characteristic of the food product. The at least one processor may receive a selection of the food product over a data channel; and generate a cooking program based at least in part on the received selection of the food product. The at least one processor may cause the at least one of an update to the cooking program or a cooking projection parameter relating to the cooking process to be presented by a user computing device. The at least one processor may send data relating to a cooking projection parameter to the user computing device over a data channel. The at least one processor may cause the determination of at least one of a cooking temperature or a cooking time for the food product.

The at least one processor may, subsequent to receipt of the request for preparation of the food product, cause at least one supplemental prompt to be presented by a user computing device; receive a response to the at least one supplemental prompt; and determine at least one food preparation parameter for the cooking program based at least in part on the received response to the supplemental prompt. The at least one processor may cause at least one supplemental prompt to be presented by the user computing device, the at least one supplemental prompt relates to at least one of a physical characteristic of the food product, an environmental condition, or a food preparation condition. The at least one processor may cause at least one supplemental prompt to be presented by the user computing device, the at least one supplemental prompt relates to at least one of a size of the food product, a shape of the food product, a class of the food product, a temperature of the food product, an altitude, a geographic location, or a cooking method.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with communications devices (e.g., smartphones, personal computers, tablet computers, personal digital assistants), server computers, and/or communications networks have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

Figure 1:
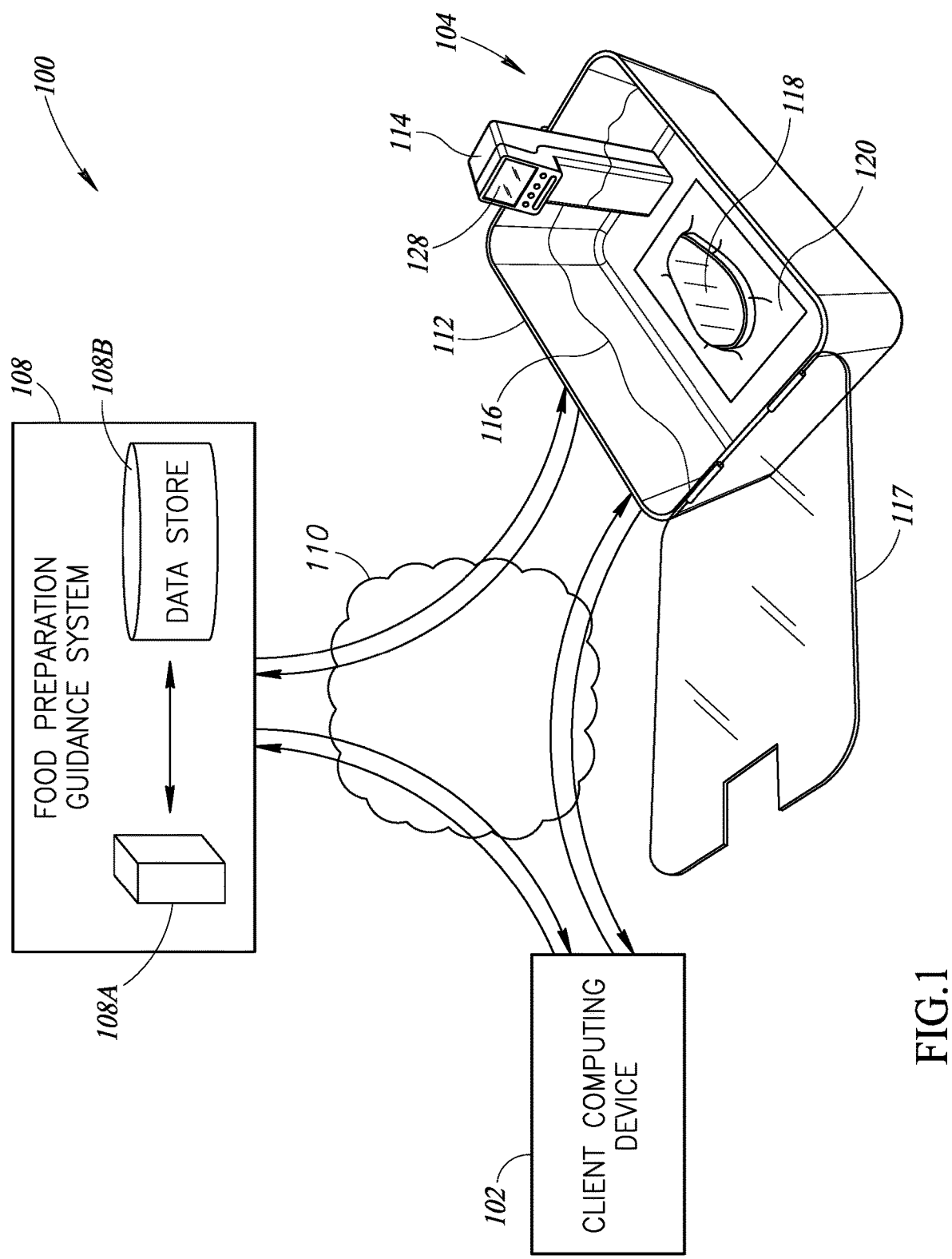
FIG. 1 is a schematic view of an environment in which a food preparation guidance system may be implemented, according to at least one illustrated embodiment.

FIG. 1 shows a networked environment 100 for use in providing customized food preparation instruction, guidance and/or control. As illustrated in FIG. 1, the networked environment 100 may include a client computing device 102, a cooking appliance 104 and a food preparation guidance (FPG) system 108 communicatively coupled together via one or more communications channels, for instance communications networks 110 (e.g., LAN, WAN, Internet, Worldwide Web, cellular network, USB®, Bluetooth®, WIFI®, NFC).

In the illustrated implementation, the cooking appliance 104 takes the form of a sous vide cooker that includes a vessel or container 112 and a thermal immersion circulator 114 coupled to, for instance, an edge of the container. In some implementations, the cooking appliance may be other types of cooking appliances, such as an oven, induction cooker, etc. The container 112 holds a quantity (e.g., 10 liters) of liquid 116 (e.g., water) that may be heated and circulated using the thermal immersion circulator 114. In addition to liquid, other fluids (e.g., air, oil) may alternatively or additionally be used. Further, in some implementations the container 112 may be insulated and/or may have a selectively removable cover or lid 117. In the illustrated example, a food product 118 is placed inside a vacuum-sealed plastic bag or pouch 120 which is immersed in the liquid bath 116. In some implementations, the food product 118 may be placed inside of a resealable plastic bag or jar. The food product 118 may be any of a number of different types of food products, such as meats, eggs or vegetables. Some food products, such as eggs, may be placed directly in the liquid bath 116 without use of the plastic bag 120. Further, in instances where the cooking appliance utilizes a non-liquid fluid (e.g., air), the food product may be placed inside the vessel or cooking chamber without use of a container that separates the food product from the fluid.

Figure 2:
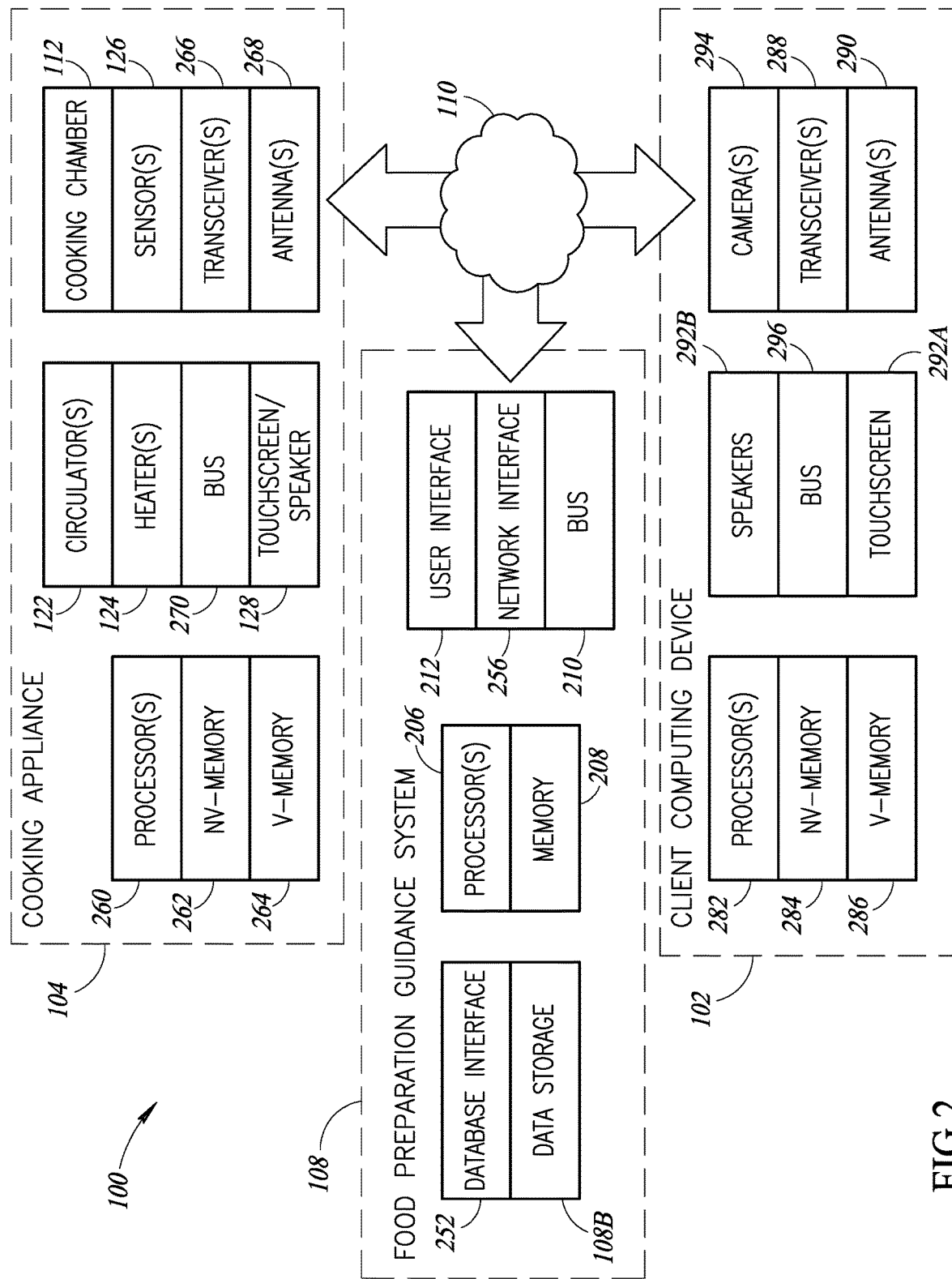
FIG. 2 is a functional block diagram of the food preparation guidance system of FIG. 1, according to at least one illustrated embodiment.

The thermal immersion circulator 114 may be an electrically powered device that circulates and heats the liquid bath 116 at an accurate and stable temperature. The thermal immersion circulator 114 may include a circulator pump 122 (FIG. 2) to move the liquid in the liquid bath 116 and a heating element 124 (FIG. 2) immersed in the liquid to heat the liquid. The thermal immersion circulator 114 may also include a probe or sensor 126 (FIG. 2), for example, a temperature sensor to sense the temperature of the liquid bath 116 and control circuitry which compares the temperature measured by the temperature probe with a desired temperature value and supplies power to the heating element as required to control the temperature of the liquid bath. Various components of the cooking appliance 104 are shown in FIG. 2. The control circuitry may control the temperature of the liquid bath 116 so that the food product 118 may be cooked according to particular cooking instructions or a determined cooking program. For example, in the case where the food product 118 is a one-inch thick rib-eye steak, the control circuitry may be programmed to heat the liquid bath 116 to a temperature of 60° C., whereas the control circuitry may be programmed to heat the liquid bath to a temperature of 85° C. to cook root vegetables.

The thermal immersion circulator 114 may include a user interface 128 that includes one or more inputs (e.g., buttons, touch screen, microphone) and one or more outputs (e.g., screen, LED(s), speaker(s)). The user may interact with the user interface 128 to select one or more cooking programs, select one or more temperature settings or select one or more cooking durations. As discussed below, in some implementations the user interface 128 may provide information to the user relating to the current status or estimated future status for a cooking process. In some implementations, the thermal immersion circulator 114 may not include a user interface and the user may interact with a user interface integrated into the cooking appliance 104 or an interface of another device (e.g., a smartphone or tablet computer communicatively coupled to the cooking appliance and/or the circulator 114).

In some implementations, the control circuitry may utilize a proportional-integral-derivative (PID) control scheme to accurately control the temperature of the liquid bath 116 according to a determined cooking program or process. A PID controller calculates an error value as the difference between a measured temperature and a desired set point. The PID controller attempts to minimize the error by adjusting the temperature through use of the controllable heating element 124. Generally, the PID controller algorithm involves three separate constant parameters (e.g., "P", "I", "D"). These parameters may be interpreted in terms of time: P depends on the present temperature error, I depends on the accumulation of past temperature errors, and D is an estimation of future temperature errors based on current rate of change. The weighted sum of these three actions may be used to adjust the temperature control for the cooking process via controlling the power supplied to the controllable heating element 124. In some implementations, other control algorithms may be used, such as PI control, PD control, P control, I control or other linear or nonlinear control schemes.

In some implementations, a user may utilize the client computing device 102 to interact with the cooking appliance 104. For example, the client computing device 102 may execute a program or "app" that provides at least one of instructions or data to the cooking appliance 104 and receives information from the cooking appliance via a suitable communications interface (e.g., Bluetooth®, USB®, WIFI®).

Additionally, a user may use the client computing device 102 to experience (e.g., view, listen) one or more audio/image/video ("media") depictions of a prepared food product. The one or more media depictions may present audio or visual depictions of the prepared food product at various gradations or variants of an ending characteristic, such as texture, consistency or doneness. The media depictions allow the user to simply select a preferred gradation for one or more characteristics of a cooked food product, such as the texture or consistency of an egg yolk, the texture or consistency of an egg white, or the texture or consistency of a steak based on visual image, pictorial or video representations of the food product at a variety of different gradations.

The user may utilize the client computing device 102 to send one or more input parameters such as ending preferences or starting conditions to the food preparation guidance (FPG) system 108 via one or more communications channels such as the communications networks 110. In response, the FPG system 108 may send output food preparation parameters or output cooking parameters (e.g., time, temperature, pressure, speed, etc.) to the cooking appliance 104 over communications networks 110 to autonomously control the cooking appliance. The FPG system 108 may communicate directly with the cooking appliance 104 via the communications networks 110 or may communicate with the cooking appliance indirectly via the client computing device 102. In some implementations, the user may view the output cooking parameters or program on a display of the client computing device 102 or the cooking appliance 104. The cooking appliance 104 may then prepare the food product 118 according to the received food preparation parameters or program. Although the term "cooking" is used herein, it should be appreciated that the present implementations may also be applied to food preparation that does not necessarily require heat, such as preparing a puree, ice cream, smoothie, dough, or other food products.

The FPG system 108 may take the form of one or more server computer systems 108A with associated nontransitory processor-readable storage media or data store 108B. While illustrated as a single server computer system 108A and associated nontransitory storage media 108B, many implementations may employ two or more server computer system 108A and/or nontransitory associated processor- or computer-readable storage media 108B. In some implementations or instances, the nontransitory processor- or computer-readable media 108B may include a database or other data structure which stores one or more of: image data, video data, audio data, cooking simulation models, lookup tables, food preparation algorithms, customer identifiers, customer account identifiers, customer identity information, financial account information (e.g., credit and/or debit account numbers, expiration dates, security codes), customer cooking history, data captured during cooking processes, and/or other data or statistics.

While generally described below in terms of a user interface generated via instructions executing on a computing device, in some implementations the FPG system 108 may serve as a user portal that may operate, for example, as a Web server, serving HTML pages or providing Web services which function as the user interface. Thus, in some implementations, the FPG system 108 serves as a user portal, providing a user interface, for instance a Web based interface, which allows users access functionality disclosed herein via various processor-based computing devices 102.

A user interface displayed on the display of the computing device 102 may include various pull-down menus, tabs, user selectable icons, input fields, scroll bars, images, videos, audio, and dialog boxes, as well as other user interface components. The user interface may allow a user or customer to create a user or customer account using the computing device 102. The user or customer may enter their full name, screen name or nickname, address, and/or date of birth. The user or customer may optionally enter financial account information, for instance an account number, expiration date, and validation or security code associated with a charge or debit account. This allows automated charging or debiting on purchase of items, goods or services by the user or customer.

The various systems, subsystems, and/or processor-based devices are capable of communications, for example, via the one or more networks 110 which may be, for instance, packet switched communications networks, such as the Internet, Worldwide Web portion of the Internet, extranets, intranets, and/or various other types of telecommunications networks such as cellular phone and data networks or channels, and plain old telephone system (POTS) networks. The type of communications infrastructure should not be considered limiting. The communications networks 110 may take any of a large variety of forms, and may include modems (e.g., DSL modem, cable modem), routers, network switches, and/or bridges, etc.

While often illustrated as a single nontransitory processor-readable storage medium, in many implementations each of the various illustrated nontransitory computer- or processor-readable storage media may constitute a plurality of nontransitory storage media. The plurality of nontransitory storage media may be commonly located at a common location, or distributed at a variety of remote locations. Database(s) may be stored separately from one another on separate computer- or processor-readable storage medium or may be stored on the same computer- or processor-readable storage medium as one another. Various computer- or processor-readable storage medium may be co-located with the corresponding computer systems, for example, in the same room, building or facility. Alternatively, various computer- or processor-readable storage medium may be located remotely from the corresponding computer systems (e.g., server computer systems) for example, in a different facility, city, state or country. Electronic or digital information, files or records or other collections of information may be stored at specific locations in non-transitory computer- or processor-readable media, thus are logically addressable portions of such media, which may or may not be contiguous.

While FIG. 1 illustrates a representative networked environment 100, typical networked environments may include many additional computer systems and entities. The concepts taught herein may be employed in a similar fashion with more populated networked environments than that illustrated in FIG. 1. For example, there are likely hundreds, if not thousands or even millions of users or customers, computing devices 102 and cooking appliances 104. There may be more than one FPG system 108, for example, located in different countries or regions within a country. Further, some or all of the FPG system 108 may be implemented within the computing devices 102 and/or the cooking appliance 104.

In implementations where the cooking appliance 104 implements sous vide cooking, the cooking appliance may measure the temperature of the liquid bath 116 and measure or estimate the amount of heat transferred to the liquid. For implementations where the cooking appliance 104 is of another type, the cooking appliance may measure the surface temperature of the food product 118 using a suitable sensor and measure or estimate the amount of heat that is absorbed by the food product. In some implementations, the cooking appliance 104 measures the surface temperature of the food product 118 and measures one or more interior temperatures of the food product.

The cooking appliance 104 collects and stores some or all of the aforementioned data at fixed or variable time intervals. This collection of data forms a collection of time-series data that may be processed to provide updates to a cooking program and/or to provide cooking projections presentable to a user through a user interface, such as a display of the client computing device 102 or a display of the cooking appliance 104.

As discussed above, the client computing device 102 is operative to communicate with the FPG system 108 and the cooking appliance 104 via the communication networks 110. The client computing device 102 may allow a user to select an end result for the food product 118 which the user is cooking via the user interface. For example, the user may select an image displayed on a display of the user interface of the client computing device 102 that corresponds to a desired doneness of meat. As another example, the user may select a video that depicts a desired texture for a custard.

The client computing device 102 may also allow the user to provide information indicating what food product(s) the user plans to prepare. For example, the user may provide or select a recipe for a food product. The amount of detail provided by the user may alter how the food product is prepared by the cooking appliance 104. For example, simply indicating a food product as a steak may generate a different cooking program than indicating a food product is four prime-grade, two centimeters thick, top-loin steaks that weigh 1.3 kilograms.

As an example, the user may input any or all of the following relating to a food product to be prepared: the species and/or muscles of cuts of meat, fish or poultry; one or more ingredients in the plastic pouch, the initial temperature of the food product; the volume or mass of the food product; the surface area of the food product; or how the raw food product was prepared (e.g., brined, dry-aged, marinated, cured, blended, ground, molded). The user may also input the shape of the food product, such as its characteristic length or width, or a description of the food product (e.g., "slab-like," "large egg"). In some implementations, the user may input or select one or more photographs or videos of the food product which may be usable by the client computing device 104, FPG system 108, and/or cooking appliance 104 to generate a cooking program for preparing the food product 118.

In some implementations, the user may select a recipe that provides information usable by the client computing device 102, the FPG system 108, and/or cooking appliance 104 to generate a cooking program for preparing the food product 118. For example, the user may select a recipe on a Web site which automatically provides details to the computing device 102, the FPG system 108, and/or cooking appliance 104 about the food product to be prepared upon selection of the recipe. In some implementations, the user may be able to modify the selected recipe to suit the user's particular preferences.

The cooking appliance 104 may transmit various data or information to the client computing device 102 and/or to the FPG system 108. For example, the cooking appliance 104 may from time-to-time transmit a subset or all of the collected time-series measurement data to the client computing device 102 or to the FPG system 108. In some implementations, the cooking appliance 104 may transmit only a subset of the collected time-series data that includes the most recent measurement or the measurements obtained since the previous successful transmission of the measurement data to the client computing device 102.

The cooking appliance 104 may also transmit information about the present state of the cooking appliance and/or one or more previous states of the cooking appliance. Such information may include whether the cooking appliance 104 is powered on or in a standby mode, current and previous set-point temperatures, or any manually adjusted parameters of the cooking appliance, such as a manually selectable temperature set-point. The cooking appliance 104 may also transmit information about non-standard operating conditions, such as power interruptions or a low liquid level for the liquid bath 116. The cooking appliance 104 may also transmit system parameters, such as control parameter settings, firmware version, memory usage, sample rate, etc. The cooking appliance 104 may also transmit information or data received from the FPG system 108 to the client computing device 102, or vice versa.

The client computing device 102 may transmit various data or information to the cooking appliance 104 and/or to the FPG system 108. For example, the client computing device 102 may transmit a cooking program to the cooking appliance 104 or new firmware to the cooking appliance.

A cooking program may include, for example, a program type, a program start time (e.g., immediately or at a determined future time), and a recipe or dish title (e.g., eggs, steak). The cooking program may also specify a set-point temperature for the liquid bath 116 (e.g., 60° C., 75° C.) of a sous vide cooker. The cooking program may also specify a cooking duration, which may begin after a starting event. The starting event may be a time when the cooking program is received by the cooking appliance 104 or when the liquid bath 116 has been heated to a determined temperature (e.g., a set-point temperature). The starting event may also be when the cooking appliance 104 senses that the food product 118 has been inserted therein or when the user indicates the food product has been inserted into the cooking appliance 104. The starting event may also occur at a determined time or after a determined delay after one or more events.

The cooking program may also indicate whether the liquid bath 116 should be pre-heated prior to insertion of the food product 118 into the liquid bath. For example, the cooking program may specify that the liquid bath 116 should be heated to at least 40° C. before the food product is placed in the liquid bath. As another example, the cooking program may indicate that the food product 118 should be placed in the liquid bath 116 without pre-heating the liquid bath.

In some implementations, the cooking program may include parameters used to implement an accelerated cooking program. For example, an accelerated cooking program may cause the liquid bath 116 to be heated to a first temperature above a set-point temperature for a period of time, and then the temperature of the liquid bath may be reduced to a second temperature at or near the set-point temperature for the remainder of the cooking period. As discussed more below, the cooking program may utilize a characteristic of the food product (e.g., mass) or one or more measurements (e.g., temperature, power) to determine how much additional power is needed to heat the food product 118, and use full power delivery until that amount of power has been delivered.

The cooking program may also indicate whether the cooking appliance 104 should use the time-series data to determine or forecast near equilibrium conditions for the food product 118 indicative of completion of a cooking process.

In some implementations, the cooking program may indicate the amount of time the food product 118 should be held at the set-point temperature or at a safe holding temperature. For example, a cooking program may indicate that the set-point temperature is reduced to a lower temperature after the food product has been held at a higher temperature for a determined period of time. This feature may minimize or reduce undesirable texture changes in the food product that could occur if the food product is held at a relatively high temperature for an extended duration.

The cooking program may also include an indication relating to when the cooking program should be started. For example, the cooking program may wait for a command, wait a fixed amount of time, wait until the cooking appliance 104 is pre-heated, wait until the food product has been inserted into the cooking appliance, wait until a food product(s) is removed from the cooking appliance, etc.

The FPG system 108 may transmit various information or data to the cooking appliance 104 and/or the client computing device 102. For example, the FPG system 108 may transmit a cooking program to the cooking appliance 104 to control the operation thereof. The FPG system 108 may also transmit to the client computing device 102 a determination or estimation for when the cooking program will be completed. For example, the FPG system 108 may provide a notification on the client computing device 102 that indicates that the core of the food product will be 1° C. below a set-point temperature at a certain time (e.g., 103 minutes, 6:00 pm), so the user can plan to remove the food product from the cooking appliance 104 at that time.

The FPG system 108 may also provide suggestions to a user of the client computing device 102 based on food products currently or previously cooked by the user. For example, the FPG system 108 may recommend certain recipes or a particular doneness for a food product based on feedback gathered from past behavior of the user. Such feedback may be obtained by direct query of the user or may be obtained indirectly based on selections or actions performed by the user (e.g., selecting a particular doneness, selecting recipes in a certain class of recipes).

In some implementations, the time-series data may be filtered before used in other algorithms or methods. For example, noise may be reduced or removed from the time-series data using one or more low pass filters, total variation minimization methods, moving averages, iterative moving averages, polynomial or rational exponential fitting using various norms (e.g., L1 or L2) for minimization, or the like. In some implementations, localized disruptions, such as spikes or missing data points, may be removed. In some implementations, variable time-series data may be changed into fixed time-series data through interpolation, or fixed time-series data may be changed to variable time-series data.

Using the time-series data and the state of the cooking appliance 104, the FPG system 108 may measure or determine one or more liquid bath characteristics, food product characteristics, and/or liquid bath and food product interaction characteristics. Liquid bath characteristics may include, but are not limited to, volume, mass, initial temperature, thermal loss or gain from the environment through conduction through the container, thermal loss or gain from the environment from radiation, thermal loss to the environment from evaporation, or change in mass and volume from evaporation.

Food characteristics may include, but are not limited to, surface area, mass, volume, shape, initial temperature, state (e.g., partially frozen, fully frozen, slushy, thawed).

Liquid bath and food product interaction characteristics may include the efficiency of the liquid bath to heat the food product as measured by the thermal heat transfer coefficient between the liquid and the food product. Liquid bath and food product interaction characteristics may also include when one or more pieces of a food product are inserted into the liquid bath, which could occur before the liquid starts to heat, while the liquid is heating or after the liquid has heated to a determined temperature.

Using the time-series data and one or more of the characteristics discussed above, the FPG system 108 may perform various functions. For example, the FPG system 108 may determine or estimate how long it will take the liquid bath 116 to reach a set-point temperature. As another example, the FPG system 108 may determine or estimate when the food product 118 will be heated to a particular temperature. After heating the food product 118 to the particular temperature, the FPG system 108 may either hold the liquid bath 118 at that temperature or reduce the temperature to a safe holding temperature.

The FPG system 108 may also generate a rapid or accelerated cooking program, as discussed below with reference to FIGS. 4A and 4B. Additionally, if there is a failure, such as a power interruption, the FPG system 108 may determine whether the food is still safe for consumption. For example, the FPG system 108 may determine for how long and at what temperatures the food product was in a range that promotes foodborne pathogen growth. Further, after a recognized power interruption, the FPG system 108 may determine whether any modifications to the cooking program are required and cause such modifications to be implemented.

FIG. 2 and the following discussion provide a brief, general description of the components forming an exemplary networked environment 100 including the FPG system 108, cooking appliance 104 and computing devices 102 (only one shown) in which the various illustrated embodiments can be implemented. The networked environment 100 may, for example, implement the various functions and operations discussed immediately above in reference to FIG. 1. Although not required, some portion of the embodiments will be described in the general context of computer-executable instructions or logic, such as program application modules, objects, or macros being executed by a computer. Those skilled in the relevant art will appreciate that the illustrated embodiments as well as other embodiments can be practiced with other computer system or processor-based device configurations, including handheld devices for instance Web enabled cellular phones or PDAs, multiprocessor systems, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The FPG system 108 may take the form of a conventional PC, server, or other computing system executing logic or other machine executable instructions. The FPG system 108 includes one or more processors 206, a system memory 208 and a system bus 210 that couples various system components including the system memory 208 to the processor 206. The FPG system 108 will at times be referred to in the singular herein, but this is not intended to limit the embodiments to a single system, since in certain embodiments, there will be more than one FPG system 108 or other networked computing device involved. Non-limiting examples of commercially available systems include, but are not limited to, an 80×86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, or a 68xxx series microprocessor from Motorola Corporation.

The processor 206 may be any logic processing unit, such as one or more central processing units (CPUs), microprocessors, digital signal processors (DSPs), application-specific integrated circuits (ASICs), field programmable gate arrays (FPGAs), etc. Unless described otherwise, the construction and operation of the various blocks shown in FIG. 2 are of conventional design. As a result, such blocks need not be described in further detail herein, as they will be understood by those skilled in the relevant art.

The system bus 210 can employ any known bus structures or architectures, including a memory bus with memory controller, a peripheral bus, and a local bus. The system memory 208 includes read-only memory ("ROM") and random access memory ("RAM"). A basic input/output system ("BIOS"), which may be incorporated into at least a portion of the ROM, contains basic routines that help transfer information between elements within the FPG system 108, such as during start-up. Some embodiments may employ separate buses for data, instructions and power.

The data storage 108B of the FPG system 108 also may include a hard disk drive for reading from and writing to a hard disk, and an optical disk drive and a magnetic disk drive for reading from and writing to removable optical disks and magnetic disks, respectively. The optical disk can be a CD or a DVD, while the magnetic disk can be a magnetic floppy disk or diskette. The hard disk drive, optical disk drive and magnetic disk drive communicate with the processor 206 via the system bus 210. The hard disk drive, optical disk drive and magnetic disk drive may include interfaces or controllers (not shown) coupled between such drives and the system bus 210, as is known by those skilled in the relevant art. The drives and their associated computer-readable media provide nonvolatile storage of computer-readable instructions, data structures, program modules and other data for the FPG system 108. Those skilled in the relevant art will appreciate that other types of computer-readable media may be employed to store data accessible by a computer, such as magnetic cassettes, flash memory cards, Bernoulli cartridges, RAMs, ROMs, smart cards, etc.

Program modules can be stored in the system memory 208, such as an operating system, one or more application programs, other programs or modules, and program data.

The application program(s) may include logic capable of providing customized food preparation guidance or instructions to the cooking appliance 104 directly or through the user computing device 102. For example, where the user or customer selects one or more starting conditions and/or ending preferences, the FPG system 108 may determine one or more food preparation parameters based on the starting conditions or ending preferences. For example, the one or more starting conditions may relate to food type, food size, food weight, starting temperature, altitude, geographic location, or the like. Ending preferences may include temperature, texture, "doneness," taste, or the like. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 206 to provide additional functionality such as geolocation data and three-dimensional position data to the processor. For example, such information may be used with captured image data to determine the size and shape of a food product using structure from the motion determination processes. As another example, in some regions or countries, terms may have different meanings (e.g., the meaning of "medium rare" may vary across geographic locations). The processor may receive geographic location information automatically (e.g., via GPS) or manually (e.g., via user input) and account for differences in terminology due to geographic location. The application program(s) may, for example, be stored within the system memory 208 as one or more sets of logic or one or more sets of machine executable instructions.

The system memory 208 may include communications programs that permit the FPG system 108 to access and exchange data with other networked systems or components, such as the cooking appliance 104, other computing devices 102, an external computer system, or the like.

The operating system, application programs, other programs/modules, program data and communications can be stored on the system memory or other data storage.

Authorized personnel can enter commands (e.g., system maintenance, upgrades, etc.) and information (e.g., cooking simulation parameters, equations, models, etc.) into the FPG system 108 using a user interface 212 that includes one or more communicably coupled input devices such as a touch screen or keyboard, a pointing device such as a mouse, and/or a push button. Other input devices can include a microphone, joystick, game pad, tablet, scanner, biometric scanning device, etc. These and other input devices are connected to the processing unit 206 through an interface such as a universal serial bus ("USB") interface that couples to the system bus 210, although other interfaces such as a parallel port, a game port or a wireless interface or a serial port may be used. The user interface 212 may include a monitor or other display device that is coupled to the system bus 210 via a video interface, such as a video adapter. In at least some instances, the input devices may be located proximate the FPG system 108, for example when the system is installed at the system user's premises. In other instances, the input devices may be located remote from the FPG system 108, for example when the system is installed on the premises of a service provider.

In some implementations, the FPG system 108 operates in an environment 100 (FIG. 1) using one or more of the logical connections to optionally communicate with one or more remote computers, servers and/or other devices via one or more communications channels, for example, one or more networks 110. These logical connections may facilitate any known method of permitting computers to communicate, such as through one or more LANs and/or WANs. Such networking environments are well known in wired and wireless enterprise-wide computer networks, intranets, extranets, and the Internet.

In some implementations, a network port or interface 256, communicatively linked to the system bus 210, may be used for establishing and maintaining communications over the communications network 110. Further, a database interface 252, which is communicatively linked to the system bus 210, may be used for establishing communications with the nontransitory processor-readable storage medium or data store 108B, which may be a part of the FPG system 108 or at least in operative communication therewith. For example, the data store 108B may include a repository for storing information regarding cooking programs, cooking simulation parameters, cooking simulation models, media files depicting ending gradations or preferences for food products (e.g., images or videos depicting texture and/or consistency of an egg yolk, textures and/or consistency of an egg white, images depicting exterior of a steak, images depicting an interior of a steak), end user account information (e.g., user cooking appliances and parameters therefor, user preferences, etc.), end user computing device information, system user specific information relevant to providing one or more customized food preparation instructions to the end user, or combinations thereof. In some embodiments, the database interface 252 may communicate with the data store 108B via the networks 110.

In the networked environment 100 (FIG. 1), program modules, application programs, or data, or portions thereof, can be stored in another server computing system (not shown). Those skilled in the relevant art will recognize that the network connections shown in FIG. 2 are only some examples of ways of establishing communications between computers, and other connections may be used, including wirelessly. In some embodiments, program modules, application programs, or data, or portions thereof, can even be stored in other computer systems or other devices (not shown).

The processor 206, system memory 208, network port 256 and database interface may be communicatively coupled to each other via the system bus 210, thereby providing connectivity between the above-described components. In alternative embodiments, the above-described components may be communicatively coupled in a different manner than illustrated in FIG. 2. For example, one or more of the above-described components may be directly coupled to other components, or may be coupled to each other, via intermediary components (not shown). In some embodiments, system bus 210 is omitted and the components are coupled directly to each other using suitable connections.

The computing device 102 can include any device, system or combination of systems and devices having at least wired or wireless communications capabilities. In most instances, the computing device 102 includes additional devices, systems, or combinations of systems and devices capable of providing graphical data display capabilities. Examples of such computing devices 102 can include without limitation, cellular telephones, smart phones, tablet computers, desktop computers, laptop computers, ultraportable or netbook computers, personal digital assistants, handheld devices, and the like.

The computing device 102 may include one or more processors 282 and nontransitory computer- or processor-readable media or memory, for instance one or more non-volatile memories 284 such as read only memory (ROM) or FLASH memory and/or one or more volatile memories 286 such as random access memory (RAM).

The computing device 102 may include one or more transceivers or radios 288 and associated antennas 290. For example, the computing device 102 may include one or more cellular transceivers or radios, one or more WIFI® transceivers or radios, and one or more BLUETOOTH® transceivers or radios, along with associated antennas. The computing device 102 may further include one or more wired interfaces (not shown) that utilize parallel cables, serial cables, or wireless channels capable of high speed communications, for instance, via one or more of Fire-Wire®, Universal Serial Bus® (USB), Thunderbolt®, or Gigabyte Ethernet®, for example.

The computing device 102 may include a user input/output subsystem, for example including a touchscreen or touch sensitive display device 292A and one or more speakers 292B. The touchscreen or touch sensitive display device 292A can include any type of touchscreen including, but not limited to, a resistive touchscreen or a capacitive touchscreen. The touchscreen or touch sensitive display device 292A may present a graphical user interface, for example in the form of a number of distinct screens or windows, which include prompts and/or fields for selection. The touchscreen or touch sensitive display device 292A may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example, a microphone, a barometer (e.g., for altitude estimation), an alphanumeric keypad, a QWERTY keyboard, a joystick, scroll wheel, touchpad or similar physical or virtual input device. For example, the computing device 102 may include a microphone that allows for voice control of the computing device.

The computing device 102 may include one or more image capture devices 294, for example, cameras with suitable lenses, and optionally one or more flash or lights for illuminating a field of view to capture images. The image capture device(s) 294 may capture still digital images or moving or video digital images. Image information may be stored as files via the non-volatile memory 284, for example.

Some or all of the components within the computing device 102 may be communicably coupled using at least one bus 296 or similar structure adapted to transferring, transporting, or conveying data between the devices, systems, or components used within the computing device 102. The bus 296 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 296.

The processor(s) 282 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 282, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 282 upon initial application of power. The processor(s) 282 may also execute one or more sets of logic or one or more machine executable instruction sets loaded from the volatile memory 286 subsequent to the initial application of power to the processor 282. The processor 282 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 282 to provide additional functionality such as geolocation data and three-dimensional position data to the processor 282.

The transceivers or radios 288 can include any device capable of transmitting and receiving communications via electromagnetic energy.

Non-limiting examples of cellular communications transceivers or radios 288 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 288 can include more than one interface. For example, in some instances, the cellular transceivers or radios 288 can include at least one dedicated, full- or half-duplex, voice call interface and at least one dedicated data interface. In other instances, the cellular transceivers or radios 288 can include at least one integrated interface capable of contemporaneously accommodating both full- or half-duplex voice calls and data transfer.

Non-limiting examples of WiFi® transceivers or radios 288 include various chipsets available from Broadcom, including BCM43142, BCM4313, BCM94312MC, BCM4312, and chipsets available from Atmel, Marvell, or Redpine. Non-limiting examples of Bluetooth® transceivers or radios 288 include various chipsets available from Nordic Semiconductor, Texas Instruments, Cambridge Silicon Radio, Broadcom, and EM Microelectronic.

As noted, nontransitory computer- or processor-readable media can include non-volatile storage memory 284 and in some embodiments may include volatile memory 286 as well. At least a portion of the memory may be used to store one or more processor executable instruction sets for execution by the processor 282. In some embodiments, all or a portion of the memory may be disposed within the processor 282, for example in the form of a cache. In some embodiments, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing applications or "apps" executable by the processor 282 may be stored in whole or in part in at least a portion of the memory 284, 286. In at least some instances, the applications may be downloaded or otherwise acquired by the end user, for example using an online marketplace such as the Apple App Store, Amazon Marketplace, or Google Play marketplaces. In some implementations, such applications may start up in response to selection of a corresponding user selectable icon by the user or consumer. The application can facilitate establishing a data link between the computing device 102 and the FPG system 108 or the cooking appliance 104 via the transceivers or radios 288 and communication networks 110.

As discussed in more detail below, the application(s) may include logic or instructions to provide the end user with access to a number of graphical screens or windows with prompts, fields, and other user interface structures that allow the user or consumer to obtain food preparation instructions, control or guidance via the FPG system 108. Such may include, for example, logic or machine executable instructions for various screens or windows.

The cooking appliance 104 can include a device, system or combination of systems and devices that implement the disclosed functionality. In some implementations, the cooking appliance 104 has wired or wireless communications capabilities and includes additional devices, systems, or combinations of systems and devices capable of providing graphical data display capabilities. Examples of such cooking appliances can include without limitation, thermal immersion circulators and vessels, water ovens, baking ovens, induction cookers, and the like.

The cooking appliance 104 may include one or more processors 260 and nontransitory computer- or processor-readable media, for instance one or more nonvolatile memories 262 such as read only memory (ROM) or FLASH memory and/or one or more volatile memories 264 such as random access memory (RAM).

The cooking appliance 104 may include a cooking chamber 112 (e.g., a container, vessel) with one or more heaters 124 positioned therein to, for example, heat a fluid (e.g., water, air) inside the cooking chamber. The cooking chamber 112 may be insulated and may include a selectively closable cover (e.g., lid, door). The cooking appliance 104 may also include one or more circulator(s) or circulator pumps 122 that stir a fluid. As discussed above, the cooking appliance 104 may also include one or more sensors or detectors 126 that sense or detect one or more characteristics, such as temperature, pressure, power, motion, fluid flow, presence or absence of a food product, etc. The circulator(s) 122, heater(s) 124, and sensor(s) 126 may be operatively coupled to the one or more processors 260. The sensors 126 may include one or more of a thermocouple, thermistor, platinum resistance temperature detector (RTD), positive temperature coefficient (PTC) heater/element, blackbody/infrared emissions detector, voltage sensor, current sensor (e.g., shunt resistor, current transformer, Hall effect sensor, magnetometer/GMR (giant magnetoresistive)), resistance sensor, barometer (e.g., for altitude estimation), etc.

The cooking appliance 104 may include one or more transceivers or radios 266 and associated antennas 268. For example, the cooking appliance 104 may include one or more cellular transceivers or radios, one or more WIFI® transceivers or radios, and one or more BLUETOOTH® transceivers or radios, along with associated antennas. The cooking appliance 104 may further include one or more wired interfaces (not shown) that utilize parallel cables, serial cables, or wireless channels capable of high speed communications, for instance, via one or more of FireWire®, Universal Serial Bus® (USB), Thunderbolt®, or Gigabyte Ethernet®, for example.

The cooking appliance 104 may include a user input/output subsystem 128, for example including a touchscreen or touch sensitive display device and one or more speakers. The touchscreen or touch sensitive display device can include any type of touchscreen including, but not limited to, a resistive touchscreen or a capacitive touchscreen. The touchscreen or touch sensitive display device may present a graphical user interface, for example in the form of a number of distinct screens or windows, which include prompts and/or fields for selection. The touchscreen or touch sensitive display device may present or display individual icons and controls, for example virtual buttons or slider controls and virtual keyboard or key pads which are used to communicate instructions, commands, and/or data. While not illustrated, the user interface may additionally or alternatively include one or more additional input or output devices, for example a microphone, an alphanumeric keypad, a QWERTY keyboard, a joystick, scroll wheel, touchpad or similar physical or virtual input device. For example, the cooking appliance 104 may include a microphone that allows for voice control of the cooking appliance.

Some or all of the components within the cooking appliance 104 may be communicably coupled using at least one bus 270 or similar structure adapted to transferring, transporting, or conveying data between the devices, systems, or components used within the cooking appliance 104. The bus 270 can include one or more serial communications links or a parallel communications link such as an 8-bit, 16-bit, 32-bit, or 64-bit data bus. In some embodiments, a redundant bus (not shown) may be present to provide failover capability in the event of a failure or disruption of the primary bus 270.

The processor(s) 260 may include any type of processor (e.g., ARM Cortext-A8, ARM Cortext-A9, Snapdragon 600, Snapdragon 800, NVidia Tegra 4, NVidia Tegra 4i, Intel Atom Z2580, Samsung Exynos 5 Octa, Apple A7, Motorola X8) adapted to execute one or more machine executable instruction sets, for example a conventional microprocessor, a reduced instruction set computer (RISC) based processor, an application specific integrated circuit (ASIC), digital signal processor (DSP), or similar. Within the processor(s) 260, a non-volatile memory may store all or a portion of a basic input/output system (BIOS), boot sequence, firmware, startup routine, and communications device operating system (e.g., iOS®, Android®, Windows® Phone, Windows® 8, and similar) executed by the processor 260 upon initial application of power. The processor(s) 260 may also execute one or more sets of logic or one or more machine executable instruction sets loaded from the volatile memory 264 subsequent to the initial application of power to the processor 260. The processor 260 may also include a system clock, a calendar, or similar time measurement devices. One or more geolocation devices, for example a Global Positioning System (GPS) receiver and one or more position sensing devices (e.g., one or more microelectromechanical systems or "MEMS" accelerometers, gyroscopes, etc.) that are not shown in FIG. 2 may be communicably coupled to the processor 260 to provide additional functionality such as geolocation data and three-dimensional position data to the processor 260.

The transceivers or radios 266 can include any device capable of transmitting and receiving communications via electromagnetic energy.

Non-limiting examples of cellular communications transceivers or radios 266 include a CDMA transceiver, a GSM transceiver, a 3G transceiver, a 4G transceiver, an LTE transceiver, and any similar current or future developed computing device transceiver having at least one of a voice telephony capability or a data exchange capability. In at least some instances, the cellular transceivers or radios 266 can include more than one interface. For example, in some instances, the cellular transceivers or radios 266 can include at least one dedicated, full- or half-duplex, voice call interface and at least one dedicated data interface. In other instances, the cellular transceivers or radios 266 can include at least one integrated interface capable of contemporaneously accommodating both full- or half-duplex voice calls and data transfer.

Non-limiting examples of WiFi® transceivers or radios 266 include various chipsets available from Broadcom, including BCM43142, BCM4313, BCM94312MC, BCM4312, and chipsets available from Atmel, Marvell, or Redpine. Non-limiting examples of Bluetooth® transceivers or radios 266 include various chipsets available from Nordic Semiconductor, Texas Instruments, Cambridge Silicon Radio, Broadcom, and EM Microelectronic.

As noted, nontransitory computer- or processor-readable medium can include non-volatile storage memory and in some embodiments may include a volatile memory as well. At least a portion of the memory is used to store one or more processor executable instruction sets for execution by the processor 260. In some embodiments, all or a portion of the memory may be disposed within the processor 260, for example in the form of a cache. In some embodiments, the memory may be supplemented with one or more slots configured to accept the insertion of one or more removable memory devices such as a secure digital (SD) card, a compact flash (CF) card, a universal serial bus (USB) memory "stick," or the like.

In at least some implementations, one or more sets of logic or machine executable instructions providing programs executable by the processor 260 may be stored in whole or in part in at least a portion of the memory 262, 264. In at least some instances, the applications may be downloaded or otherwise acquired by the end user, for example using an online marketplace. In some implementations, such applications may start up in response to selection of a corresponding user selectable icon by the user or consumer. The application can facilitate establishing a data link between the cooking appliance 104 and the FPG system 108 or the computing device 102 via the transceivers or radios 266 and communication networks 110.

In some implementations, some of the components of the cooking appliance 104 may be embodied in a computing device separate from the cooking chamber 112, such as in the example shown in FIG. 1. In some embodiments, the cooking appliance 104 may be an integrated device that includes some or all of the aforementioned components. Further, it should be appreciated that although certain functions are described herein as being implemented in one of the client computing device 102, the cooking appliance 104, or the FPG system 108, some or all of such functions may be performed by numerous combinations of these devices, or may be performed in a different one or more of the devices than described above. In other words, the functionality described herein may be implemented in a highly distributed manner or may be implemented in a single self-contained device.

Figure 3:
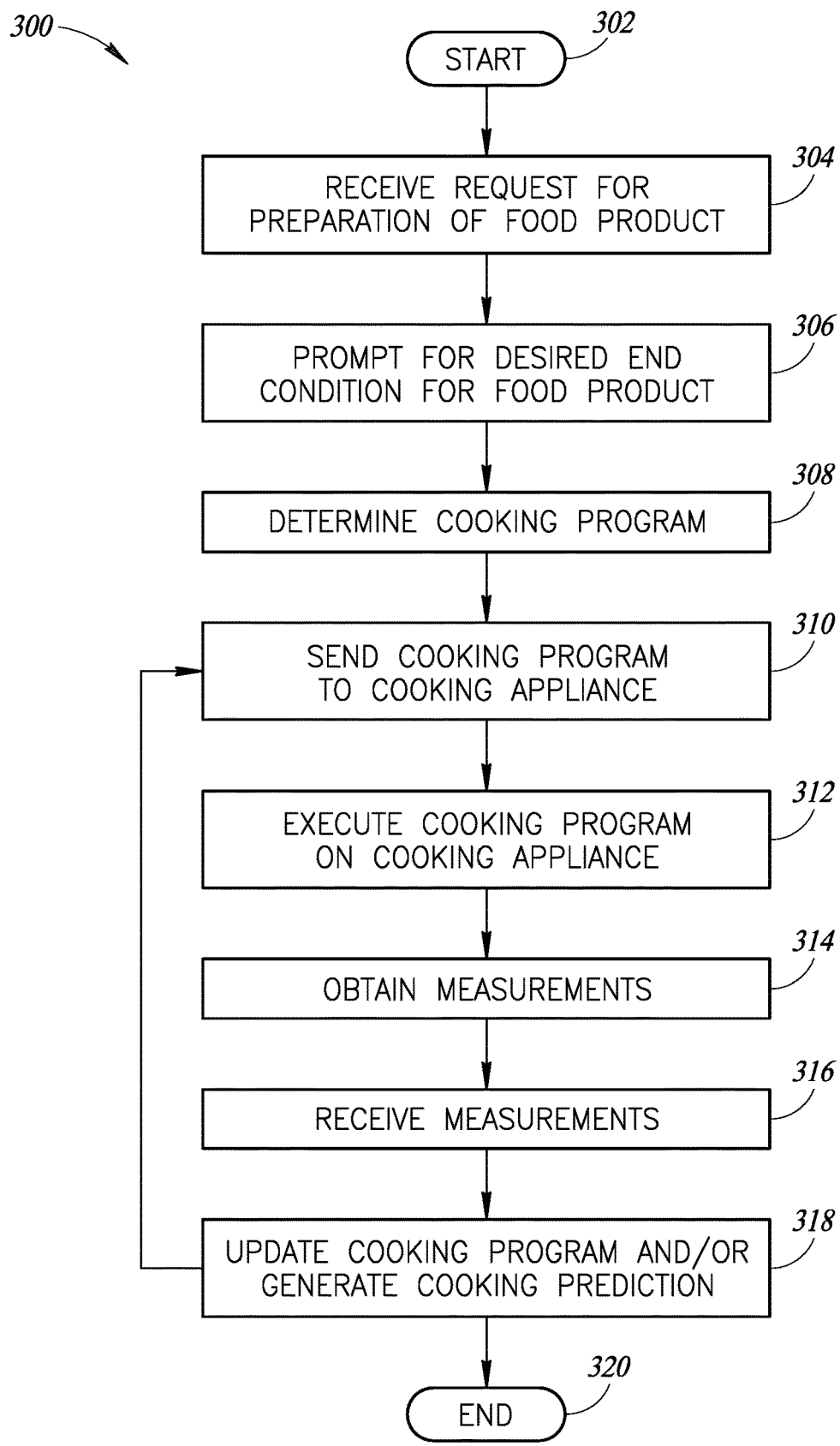
FIG. 3 is a flow diagram showing a method of operation of a processor-based device in a food preparation guidance system, according to at least one illustrated embodiment.

FIG. 3 shows a method 300 of operating a processor-based device to control preparation of a food product in a food preparation guidance (FPG) system, such as the FPG system 108 of FIGS. 1 and 2. For explanatory purposes, the method 300 is discussed in the context of a sous vide cooking process, but the method is not limited to such a cooking process. For example, the method 300 may be implemented using a baking oven or other cooking appliance. As noted above, sous vide is a method of cooking food in a liquid bath or in a temperature-controlled steam environment for longer than normal cooking times at an accurately regulated temperature much lower than normally used for conventional cooking. In some instances, the food is sealed (e.g., liquid-tight, air-tight) in plastic bags. Sous vide cooking techniques typically employ temperatures around 55° C. to 80° C. for meats and higher for vegetables. The intention is to cook the item evenly, ensuring that the inside is properly cooked without overcooking the outside, and retain moisture.

Notably, the approaches described herein provide updates to cooking programs and/or estimations about cooking processes by obtaining one or more measurements from a cooking appliance and making decisions based on the obtained measurements.

The method 300 starts at 302. For example, the method 300 may start in response to an opening of a specific application or selection of an icon displayed on a display of a computing device. In response, the processor-based device may cause a display or presentation of a splash screen or introduction screen.

At 304, the processor-based device may receive a request for preparation of a food product. For example, the processor-based device may receive a request for preparation of a steak from a user-operated client computing device over a communications network. The user may select a recipe or may manually enter instructions into a user interface via the client computing device and/or via the cooking appliance.

At 306, the processor-based device may provide a prompt for an ending condition, preference or characteristic for the selected food product, for instance, via a display of the computing device. For example, the processor-based device may display or cause to be displayed an egg white texture prompt screen that allows a user to view and scroll through images of egg whites having differing textures (e.g., runny, medium, firm). Various user interface elements may be employed, including those commonly associated with touch-screen interfaces allowing multi-finger input, tapping, and swiping. In some implementations, a set of at least two graphical prompts may include a set of still images in addition to or instead of a set of videos. In some implementations, each video or image may also include audio which may allow the user to observe additional information about a characteristic of the cooked food product (e.g., crispness, crunch, etc.). In some embodiments, a set of audio clips without visual prompts is provided.

The processor-based device may receive a selection indicative of an ending condition or preference for the food product. For example, the processor-based device may detect an input or selection of a slide bar via a touchscreen display.

At 308, the processor-based device determines a cooking program based at least in part on the received selection indicative of the food product to be prepared and/or an ending preference. For example, the processor-based device may perform one or more simulations utilizing the selected food product and ending preferences as inputs to determine a cooking time and a cooking temperature to cook the food product to achieve the selected ending preferences (e.g., texture, consistency, doneness). The processor-based device may determine one or more general food preparation parameters for the cooking program using any suitable methods, such as one or more simulations, modeling, one or more lookup tables, one or more analytical or numerically solvable equations, or the like.

At 310, the processor-based device sends the generated or determined cooking program to the cooking appliance. For example, the FPG system 108 of FIG. 1 may send the determined cooking program to the cooking appliance 104 over the communications network 110 directly or via the client computing device 102.

At 312, the cooking appliance executes the cooking program. For example, the cooking program may provide instructions to the cooking appliance to heat a liquid bath to 60° C., to alert a user to insert the food product into the liquid bath when the liquid bath reaches 60° C., and to hold the temperature of the liquid bath for three hours.

At 314, the cooking appliance obtains measurements, and stores these measurements in a data store as a time-series. As discussed above, these measurements may be obtained by sensors (FIG. 2) that directly or indirectly measure one or more of temperature, power, fluid flow, the presence or absence of a food product, liquid level, power disruptions, etc. This time-series is a record of the obtained measurements at different times. The time-series data may be arranged in chronological order or reverse chronological order. The time period between measurements may be constant or variable.

At 316, the processor-based device may receive some or all of the measurements obtained by the cooking appliance. For example, the FPG system 108 of FIG. 1 may obtain some or all of the measurements from the cooking appliance 104 over the communications network 110 directly or via the client computing device 102. In some implementations, the cooking appliance may transmit a subset of the time-series data that includes the most recent measurement or the measurements obtained since the previous successful transmission of the measurement data to the client computing device or to the FPG system.

In addition to receiving the time-series data, the processor-based device may receive metadata, such as the type of cooking appliance, user information, or recipe information. If the transmission of data includes all the information needed by the FPG system to determine or update the cooking program, the transmission may be referred to as a "system state" transmission. If the transmission of data does not include all the information needed by the FPG system but is sufficient when combined with previously sent information, the transmission may be referred to as a "system state update" transmission.

At 318, the processor-based device may update the cooking program and/or generated one or more projections about the cooking process based on the system state of the cooking appliance. As discussed above, the system state may be a synthesis of several system state updates. The updated cooking program may be sent to the cooking appliance for execution thereby. For example, the updated cooking program may alter control of one or more operational parameters of the cooking appliance (e.g., temperature, time, speed, humidity, pressure). The one or more generated projections may be provided to a user via a suitable interface, such as a user interface of a computing device and/or a user interface of the cooking appliance.

For example, based on the system state, the FPG system may determine how long it will take for a liquid bath of the cooking appliance to reach a set-point temperature. As another example, the FPG system may determine when the food product will be heated to a particular temperature and, after heating to the particular temperature, may hold the liquid bath at that temperature or may reduce the temperature to a safe holding temperature.

The FPG system may also determine when the food product has been heated to a particular fraction of the difference between the temperature of the liquid bath and the initial temperature of the food product. For example, the FPG system may determine when the food product has been heated to 90% of the difference between the temperature of the liquid bath and the initial temperature of the food product. After heating the food product to this temperature, the liquid bath may either be held at that temperature or reduced to a safe holding temperature.

The processor-based device may display or cause to be displayed the determined more accurate cooking process projection on the display of the computing device or the cooking appliance, as discussed above. The user may then utilize the provided projection for planning or other purposes.

At 320, the processor-based device ends the method 300. The method 300 terminates at 320 until called again. Alternatively, the method 300 may repeat, for example, with control returning to 304 or 310. Alternatively, the method 300 may run concurrently with other methods or processes, for example, as one of multiple threads on a multi-threaded processor system.

In some implementations, the FPG system may utilize feedback to a priori adjust one or more parameters (e.g., food preparation parameters, prompts, recommendations) for an individual user, group, friends of one or more individual users, geographic locale, or all users. For example, in some implementations, the FPG system gathers ratings from users, and the ratings may be used to adjust one or more parameters or recommendations for one or more users. As another example, the FPG system may gather information manually or automatically from users or from third party entities (e.g., social networks, retail web sites, etc.) that may be used to adjust one or more parameters, recommendations, or other features of the system for one or more users.

As noted above, the cooking appliance, computing device, and/or the FPG system may utilize various inputs to generate cooking programs, updates to cooking programs, and/or projections about one or more cooking processes.

One such input is power delivered by the cooking appliance. Power may be measured directly or indirectly, or may be derived using one or more parameters. For example, actual power may be measured using a sensor (see FIG. 2) that senses one or both of voltage and current drawn by the cooking appliance or supplied by the cooking appliance to a heating element.

Generally, power (P) may be calculated using any two of voltage (V), current (I) and resistance (R). Specifically, $P = V \times I = V^2/R = I^2 \times R$. Instantaneous power may be calculated using any pair of measurements taken at approximately the same time. Average power may be calculated by averaging a series of instantaneous power calculations. Average power may also be obtained using the equation:

$$P_{AVG} = V_{RMS} \times I_{RMS} \times \cos(\theta)$$

where $V_{RMS}$ and $I_{RMS}$ are the root-mean-square voltage and current, respectively, and θ is the phase angle between the voltage signal and the current signal.

Voltage and current may be measured using any suitable voltage measurement device. For example, current may be measured via a shunt resistor, current transformer, Hall effect sensor, etc. Resistance may be directly measured relative to a known value reference resistor, or indirectly via any other measurements responsive to resistance.

As another example, power may be measured or determined based on a power percentage or ratio from a controller, such as a PID controller. For example, if a system's maximum power is known to be 1,000 watts, and a PID controller is prescribing 50% of maximum power, it can be determined that the current output power is 50% of 1000 watts, or 500 watts. In some implementations, the PID controller's output may be pre-scaled such that the output is already in terms of watts, for example.

In some implementations, the power may be measured or determined based on a measured difference in temperature between an inlet ("cold side") and an outlet ("hot side") of a heater/circulator pump (see FIG. 2) or other stirring system. Such temperature difference may be proportional to the specific heat of the transported working medium (e.g., water) and the transported mass of the working medium. In some implementations, the cooking appliance may be programmed to deliver a specified power (e.g., in watts), which power may be known or obtained and used by the FPG system (e.g., instead of or in addition to obtaining power measurements) for updating cooking programs or generating projections about cooking processes.

Another input that may be used by the FPG system is temperature. For example, the cooking appliance may be equipped with a temperature sensor positioned at an inlet of a circulator pump or stirring system. The temperature sensor may be any suitable sensor, such as a thermocouple, thermistor, platinum resistance temperature detector (RTD), positive temperature coefficient (PTC) heater/element, or blackbody/infrared emissions detector.

Another input that may be used by the FPG system is fluid flow. Any suitable device may be used to measure fluid flow in a cooking appliance including, but not limited to, a PTC heater/element, an impeller, etc.

Other inputs that may be used by the FPG system include user inputs. Such user inputs may include information about when a food product has been inserted into the cooking appliance, characteristics about the food product or information about the cooking appliance. For example, characteristics of the food product may include its mass or weight, volume, surface area, type, temperature, etc. Information about the cooking appliance may include the type of vessel in which a thermal immersion circulator has been inserted, whether a vessel is covered, the size of a vessel, the volume of liquid in a liquid bath, whether a vessel is insulated, etc.

The FPG system may also make assumptions about a cooking appliance which may circumvent the need to measure any one or more of voltage, current or resistance to determine power delivery. As an example, the FPG system may use the output from a PID controller to approximate the power delivered by the heater. Further, the FPG system may make assumptions about the efficiency of a liquid bath for heating a food product, as measured by a surface heat transfer coefficient of the liquid to the food product. The FPG system may also make assumptions about a cooking appliance (e.g., vessel size) based on characteristics of the cooking appliance identified during previous use of the cooking appliance or previous use of similar cooking appliances. The characterizations of the cooking appliance may be based on a manufacturer's design or on empirical measurements of the same or similar cooking appliances, or based on physics calculations. As an example, assumptions may be made relating to the electrical properties of a heater element of a cooking appliance, such as the heater element's resistance versus temperature behavior.

As another example, the ratio of on-time to off-time (i.e., duty cycle) of the heater element of a cooking appliance may be used to scale an assumed or measured peak power to determine an estimate of average power. The duty cycle measurement may come from a variety of sources including, but not limited to, the output of a PID controller that controls operation of the heating element.

The FPG system may also make assumptions related to the voltage of the power source. For example, a 120 volt AC line in the United States may be assumed to be 120 volt AC+/−N %, where N is a number. Similarly, the FPG system may make assumptions related to the power factor of the power source. For example, the power factor of the power source may be assumed to be close to 1, such that current is in phase with voltage.

Figure 4A:
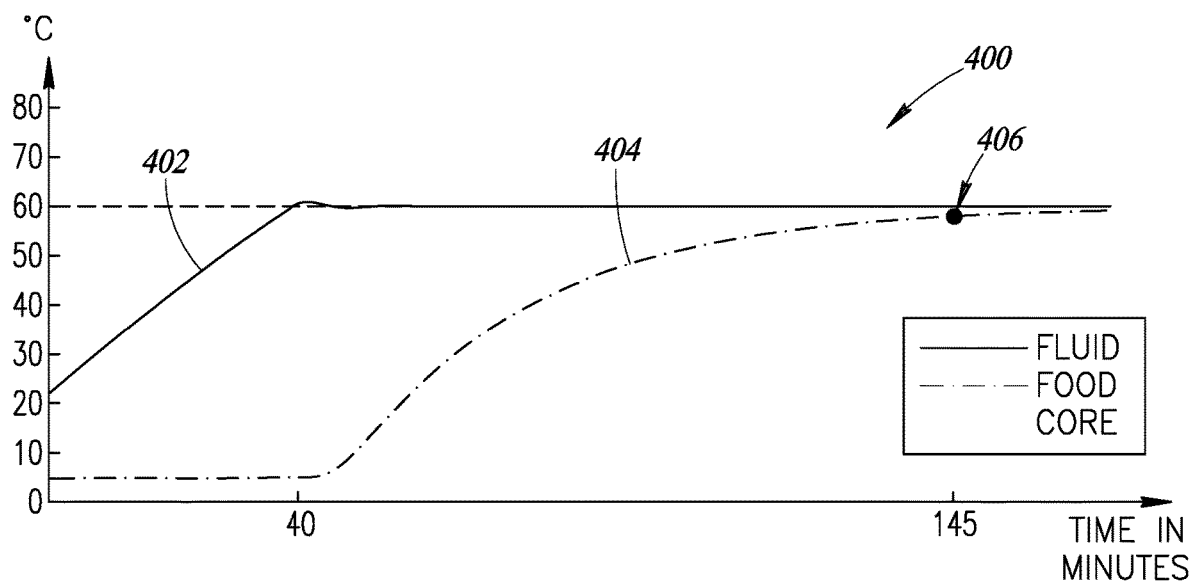
FIG. 4A is a graph showing temperatures for a liquid bath of a cooking appliance and a core of a food product during a cooking process, according to at least one illustrated embodiment.

FIG. 4A is a graph 400 showing temperatures for a liquid bath 402 of a cooking appliance and temperatures for a core of a food product 404 placed in the liquid bath during a normal cooking process. In this illustration, the food product 404 is a roast that is 52 millimeters thick and weighs 1.1 kilograms. The food product 404 is cooked to a core temperature of 60° C., in this example. At the start of the cooking process (i.e., zero minutes), the heating element of the cooking appliance begins to heat the liquid bath 402 from an initial temperature of about 22° C. to the set-point temperature of approximately 60° C. After about 40 minutes, the liquid bath 402 has reached the set-point temperature of 60° C. Shortly after the liquid bath 402 has reached the set-point temperature, the food product 404 is inserted into the liquid bath 402 of the cooking appliance. The temperature of the core of the food product 404 rises slowly until it reaches about 1° C. less than 60° C. (i.e., 59° C.) at about 145 minutes, as indicated by an arrow 406. The user may then remove the food product 404 from the liquid bath.

Figure 4B:
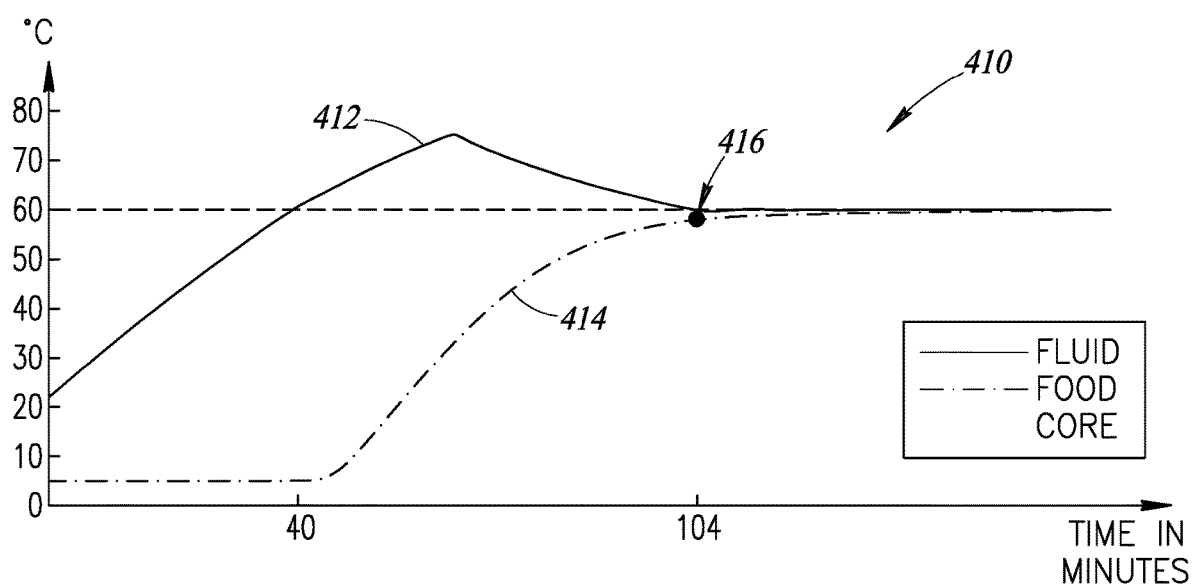
FIG. 4B is a graph showing temperatures for a liquid bath of a cooking appliance and a core of a food product during an accelerated cooking process, according to at least one illustrated embodiment.

FIG. 4B is a graph 410 showing temperatures for a liquid bath 412 of a cooking appliance and temperatures for a core of a food product 414 placed in the liquid bath during an accelerated cooking process. The food product 414 is also a roast with the same size and weight as the food product 404 of FIG. 4A. At zero minutes, the heating element of the cooking appliance begins to heat the liquid in the liquid bath 412 from an initial temperature of about 22° C. to an elevated temperature above the desired set-point temperature of 60° C. In the illustrated example, the heating element heats the liquid bath 412 to an elevated temperature of about 75° C.

After about 40 minutes, the liquid has reached 60° C. Shortly after the liquid bath 412 has reached 60° C., the food product 414 is inserted into the liquid bath 412 of the cooking appliance while the temperature of the liquid bath continues to rise to about 75° C., which is about 15° C. above the set-point temperature of 60° C. Once the temperature of the liquid bath reaches 75° C., the temperature control of the cooking appliance allows the temperature of the liquid bath 412 to fall to the set point temperature of 60° C. The temperature of the core of the food product 414 rises relatively rapidly (compared to the normal cooking process) due to the liquid bath 412 being at the elevated temperature. After a determined time, the cooking program controls the cooking appliance to lower the temperature of the liquid bath 412 to the set-point temperature of 60° C. for the remainder of the cooking process. In the illustrated example, the temperature of the liquid bath 412 is lowered from 75° C. to 60° C. after about 70 minutes from the beginning of the cooking process. In some implementations, the time at which the liquid bath 412 is maintained at an elevated temperature is at least partially dependent on a determination or estimation of when the food product 414 will reach the set point temperature and/or an estimation of how long it will take for the liquid bath 412 to cool from the elevated temperature to the set point temperature. Generally, the liquid bath 412 should be at or near the set-point temperature at or before the time when the temperature of the food product 414 approaches the set-point point temperature.

In the illustrated example, the temperature of the liquid bath 412 is reduced to the set-point temperature at about the same time the temperature of the core of the food product 414 reaches about 1° C. less than 60° C. (i.e., 59° C.) at 104 minutes, as indicated by an arrow 416. Thus, using the accelerated cooking process, the food product 414 is fully cooked in 104 minutes instead of 145 minutes. It should be appreciated that the various cooking parameters for an accelerated cooking process may be varied dependent on various factors, such as type of food, degree of acceleration desired, end preferences, etc.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation in a processor-based food preparation guidance system, the method comprising:
receiving, by at least one processor, a request for preparation of a food product;
receiving, by the at least one processor, at least one physical characteristic of the food product comprising food product type, food product weight, food product size, or initial food product temperature;
in response to the received request and the at least one physical characteristic of the food product, causing, by the at least one processor, a cooking program to be generated,
wherein the cooking program includes at least one of instructions or data usable by a thermal immersion circulator to perform a cooking process for cooking the food product, wherein the cooking program includes at least one of instructions or data usable by a cooking appliance associated with the thermal immersion circulator to perform an accelerated cooking process for the food product, wherein during the accelerated cooking process the thermal immersion circulator first heats fluid to a first temperature above a set-point temperature, and second heats fluid to a second temperature less than or equal to the set-point temperature,
wherein the thermal immersion circulator includes a heating element configured to heat a fluid bath;
controlling, by the at least one processor, the thermal immersion circulator to perform the cooking process to cook the food product according to the cooking program, wherein the cooking program specifies the set-point temperature of the food product which is set by at least one of the processor-based food preparation guidance system or a user depending upon characteristics of the food product,
wherein controlling the thermal immersion circulator to perform the cooking process includes controlling the thermal immersion circulator to heat the fluid bath to the first temperature and subsequently to second temperature so as to heat the food product to the set-point temperature;
obtaining, by the at least one processor, and storing, in a non-transitory processor-readable storage medium of the processor, a plurality of parameter measurements indicative of characteristics of the cooking process during the controlling of the thermal immersion circulator, wherein obtaining the plurality of parameter measurements indicative of the characteristics of the cooking process comprises obtaining a plurality of temporally spaced temperature measurements and corresponding power measurements of power supplied to a heating element of the cooking appliance;
determining, by the at least one processor, an estimated time when the food product is expected to be heated to the set-point temperature based at least in part on the obtained plurality of parameter measurements; and
determining that the food product has been held at the set-point temperature for a predetermined period of time, wherein in response to a positive determination the method further includes controlling, by the at least one processor, the thermal immersion circulator to hold the fluid bath at a safe holding temperature after the estimated time, wherein the safe holding temperature is less than the set-point temperature; and generating and displaying projections about the cooking process to a user, wherein the projections are based on the obtained plurality of parameter measurements, wherein the measurement indicative of the characteristic of the cooking process comprises measuring temperature of the fluid bath;

wherein the temperature of the fluid bath is measured by a sensor in direct contact with fluid of the fluid bath being pumped from an inlet to an outlet of the thermal immersion circulator.

2. The method of claim 1 wherein causing a cooking program to be generated comprises causing a cooking program to be generated at the food preparation guidance system, the method further comprising:

sending the generated cooking program from the food preparation guidance system to the thermal immersion circulator over a data channel.

3. The method of claim 2 wherein sending the generated cooking program from the food preparation guidance system to the thermal immersion circulator comprises:

sending the generated cooking program from the food preparation guidance system to the thermal immersion circulator over the data channel via a user computing device coupled to each of the food preparation guidance system and the thermal immersion circulator.

4. The method of claim 3, wherein the generated cooking program is sent wirelessly using a wireless communication network between the user computing device and the thermal immersion circulator.

5. The method of claim 1 wherein obtaining the measurement indicative of a characteristic of the cooking process comprises obtaining a temperature measurement of the fluid bath and obtaining a measurement of an amount of heat transferred to the fluid bath.

6. The method of claim 1 wherein obtaining the measurement indicative of a characteristic of the cooking process comprises obtaining a temperature measurement from a temperature sensor of at least one of a surface of the food product or an interior of the food product.

7. The method of claim 6 wherein obtaining a temperature measurement from a temperature sensor comprises obtaining a temperature measurement from at least one of a resistive temperature detector, a thermocouple, a thermistor, a positive temperature coefficient element or a blackbody/infrared emissions detector.

8. The method of claim 1 wherein obtaining the measurement indicative of a characteristic of the cooking process comprises obtaining a measurement indicative of power from at least one of a voltage sensor, a current sensor, a resistance sensor, a magnetic field sensor, a Hall effect sensor, or a giant magnetoresistance sensor.

9. The method of claim 1 wherein causing a cooking program to be generated comprises causing a cooking program to be generated that includes at least one of instructions or data usable by the thermal immersion circulator to perform the cooking process for the food product.

10. The method of claim 1, further comprising:

causing a prompt to be provided on a client computing device, the prompt including a request for a selection of an end characteristic for the food product; and receiving, by the at least one processor, a response to the prompt indicating a selection of the end characteristic for the food product;

wherein causing a cooking program to be generated comprises causing a cooking program to be generated based at least in part on the selection of the end characteristic for the food product.

11. The method of claim 10 wherein causing a prompt to be provided on a client computing device comprises causing at least one of a first set of at least two prompts to be presented by the user computing device, each of the prompts in the first set of at least two prompts depicting respective different textures, consistencies, or <loneness for the food product.

12. The method of claim 11 wherein causing at least one of a first set of at least two prompts to be presented by the user computing device comprises causing at least one of a first set of images or videos to be displayed by the user computing device.

13. The method of claim 10, wherein causing at least one of a first set of at least two prompts to be presented by the user computing device comprises causing at least one of a first set of images or videos to be displayed by the user computing device.

14. The method of claim 1 wherein causing a cooking program to be generated comprises causing a cooking program to be generated based at least in part on at least one operational characteristic of the immersion circulator.

15. The method of claim 1 wherein receiving a request for preparation of a food product comprises receiving, by the at least one processor, a request for preparation of a food product from a remotely located client computing device.

16. The method of claim 1, further comprising:

causing at least one of a first set of at least two prompts to be presented by a user computing device, each of the prompts in the first set of at least two prompts depicting a respective gradation of at least one first characteristic of the food product, the respective gradations being different from one another; and receiving, via the user computing device, a selection of one of the gradations of the at least one first characteristic of the food product;

wherein causing a cooking program to be generated comprises causing a cooking program to be generated based at least in part on the received selection of one of the gradations of the at least one first characteristic of the food product.

17. The method of claim 1 wherein receiving a request for preparation of the food product comprises receiving, via a user computing device, a selection of the food product by a processor-based food preparation guidance system over a data channel, and causing a cooking program to be generated comprises generating a cooking program by the food preparation guidance system.

18. The method of claim 1, further comprising:

causing the estimated time to be presented by a user computing device.

19. The method of claim 18 wherein causing the estimated time to be presented by a user computing device comprises sending data to the user computing device over a data channel.

20. The method of claim 1 wherein causing a cooking program to be generated comprises causing the determination of at least one of a cooking temperature or a cooking time for the food product.

21. The method of claim 1, further comprising:
subsequent to receiving the request for preparation of the food product, causing at least one supplemental prompt to be presented by a user computing device;
receiving, via the user computing device, a response to the at least one supplemental prompt; and
determining at least one food preparation parameter for the cooking program based at least in part on the received response to the supplemental prompt.

22. The method of claim 21 wherein causing at least one supplemental prompt to be presented by the user computing device comprises causing at least one supplemental prompt to be presented by the user computing device, the at least one supplemental prompt relating to at least one of a physical characteristic of the food product, an environmental condition, or a food preparation condition.

23. The method of claim 21 wherein causing at least one supplemental prompt to be presented by the user computing device comprises causing at least one supplemental prompt to be presented by the user computing device, the at least one supplemental prompt relating to at least one of a size of the food product, a shape of the food product, a class of the food product, a temperature of the food product, an altitude, a geographic location, or a cooking method.

24. The method of claim 1, further comprising:
determining, by the at least one processor, at least one of an estimation of a heat capacity of the immersion circulator or an estimation of heat loss by the immersion circulator.

25. The method of claim 1, further comprising:
detecting, by the at least one processor, a loss of power delivered to the immersion circulator; and estimating, by the at least one processor, a duration of the loss of power.

26. The method of claim 25, further comprising:
determining, by the at least one processor, at least one of an update to the cooking program, a cooking projection parameter relating to the cooking process, or a food safety indicator based at least in part on the estimated duration of the loss of power.

27. The method of claim 1 wherein causing a cooking program to be generated comprises causing the determination of the cooking temperature and the cooking time for the food product.

28. The method of claim 27, wherein causing the determination of the cooking temperature and the cooking time for the food product comprises performing one or more simulations based on user input indicative of a selected food product and one or more ending preferences.

29. The method of claim 28, wherein the one or more ending preferences comprise of one or more of texture, consistency and doneness.

30. The method of claim 1, wherein controlling, by the at least one processor, the thermal immersion circulator to perform the cooking process to cook the food product according to the cooking program comprises alerting the user to insert the food product into the fluid bath upon the fluid bath reaching a particular fluid bath temperature.

31. A method of operation in a processor-based food preparation guidance system, the method comprising:
receiving, by at least one processor, a request for preparation of a food product;
in response to the received request, causing, by the at least one processor, a cooking program to be generated, the cooking program including at least one of instructions or data usable by a cooking appliance to perform a cooking process for the food product, wherein the cooking program includes at least one of instructions or data usable by a cooking appliance to perform an accelerated cooking process for the food product, wherein during the accelerated cooking process the cooking appliance first heats fluid to a first temperature above a set-point temperature, and second heats fluid to a second temperature less than or equal to the set-point temperature;
controlling, by the at least one processor, a cooking appliance to perform the cooking process for the food product according to the cooking program;
obtaining, by the at least one processor, and storing, in a non-transitory processor-readable storage medium of the at least one processor, at least one parameter measurement indicative of a characteristic of the cooking process during the controlling of the cooking appliance, wherein obtaining the at least one parameter measurement indicative of the characteristic of the cooking process comprises obtaining a plurality of temporally spaced temperature measurements and corresponding power measurements of power supplied to a heating element of the cooking appliance;
determining, by the at least one processor, an update to the cooking program based at least in part on the obtained at least one parameter measurement; and
generating and displaying projections about the cooking process to a user, wherein the projections are based on the obtained at least one parameter measurement,
wherein the update to the cooking program or the one or more projections include an estimated time when the food product is expected to be heated to the set-point temperature.

* * * * *